Feb. 9, 1960     R. R. SANTNER ET AL     2,924,352
MEANS FOR DETECTING STORAGE TANK LEAKS
Filed May 12, 1955     2 Sheets-Sheet 1

INVENTORS.
R. R. SANTNER
C. H. TROTTER
BY
Hudson & Young
ATTORNEYS

Feb. 9, 1960  R. R. SANTNER ET AL  2,924,352
MEANS FOR DETECTING STORAGE TANK LEAKS
Filed May 12, 1955  2 Sheets-Sheet 2

INVENTORS.
R. R. SANTNER
C. H. TROTTER
BY
Hudson & Young
ATTORNEYS.

United States Patent Office 2,924,352
Patented Feb. 9, 1960

2,924,352

MEANS FOR DETECTING STORAGE TANK LEAKS

Robert R. Santner and Claude H. Trotter, Bartlesville, Okla., assignors to Phillips Petroleum Company, a corporation of Delaware Application May 12, 1955, Serial No. 507,866

6 Claims. (Cl. 220—18)

This invention relates to tanks for the storage of liquids. In one aspect this invention relates to a method and means for detecting the leakage of liquid from storage tanks and containers.

In tanks for the storage of liquids, the bottom of the tank usually rests directly upon the ground. If a leak develops in the bottom of the tank while the tank is filled with liquid, it is very difficult to detect the existance of such a leak and with tanks of over 100 feet in diameter and several hundred thousand barrels capacity, considerable loss of liquid proceeds undetected. In many cases this loss of liquid through such undetected leaks is very excessive and it is not uncommon practice to drill wells in the ground that has become saturated with the lost liquid in order to recover it. With liquids such as gasoline, this loss through seepage into the ground oftentimes presents very hazardous conditions; instances have been recorded where costly fires have occurred and water wells have become dangerously contaminated.

The conventional methods for detecting leaks have in general been restricted to tests made for leaks during the initial construction of the tanks. One method was to construct the tank on elevated supports prior to resting it upon the ground. While thus suspended, the tank is filled with water and the bottom of the tank is then inspected by crawling underneath. With tanks of any appreciable size, this method is obviously limited. Another method for detecting leaks during initial construction of the tank involved the building of an earthen dam around the outside of the tank, filling the dam with water, and then observing the inside of the tank for leaks. This method is obviously unsatisfactory, especially in sandy soil, as it will not detect all the leaks on the bottom of the tank. Other methods have been used which entail the construction of very costly tank bottoms. Another method is to detect the leaks by observing the ground outside the tank. This latter method obviously is unsatisfactory in that most of the leakage seeps down into the ground by the force of gravity and it may be a very long time before any liquid reaches the top of the ground where its presence may be detected.

An object of this invention is to provide an improved apparatus for the storage of liquids.

Another object of this invention is to provide a method and means for detecting leaks from storage tanks either at the time of construction or while the tank is in service.

Another object of this invention is to provide means for the detection of loss of liquids from storage tanks and the prevention of hazards commonly associated with such loss.

A still further object of this invention is to provide a liquid sealing means by which leakage of liquid from storage tanks is preliminarily restricted to an area of detection.

Other objects, advantages, and features will become apparent from the following disclosure and the appended claims.

In accordance with our invention we have now provided a method and means for the detection of leaks from the bottom of storage tanks during the initial construction of such tanks and/or while the tanks are in service. In the practice of our invention a liquid impervious membrane, or a reinforced concrete pad, is located below the bottom of a tank and is extended to cover the entire area beneath the tank. If a leak is present in the bottom of the tank, liquid escapes through this leak to a layer of liquid permeable base material where it gradually seeps downward by force of gravity and is restricted from further seepage downward by a liquid sealing means. The liquid then is caused to seep out to an exposed area where its presence may be observed and a leak in the tank thereby detected.

Our leak detecting method is the only one, to our knowledge, that will insure the detection of leaks before any substantial amount of liquid is lost through seepage into the ground and it is operative during initial construction of the tank and/or while the tank is in service. Upon detection of a substantial leak, the tank may be taken out of service and repairs made or, if convenient, the leaking liquid may be collected by any type of collecting receptacle or system.

Referring now to the drawings, an embodiment of the present invention is shown in Figure 1 partly in section and partly in elevation.

Figure 1:
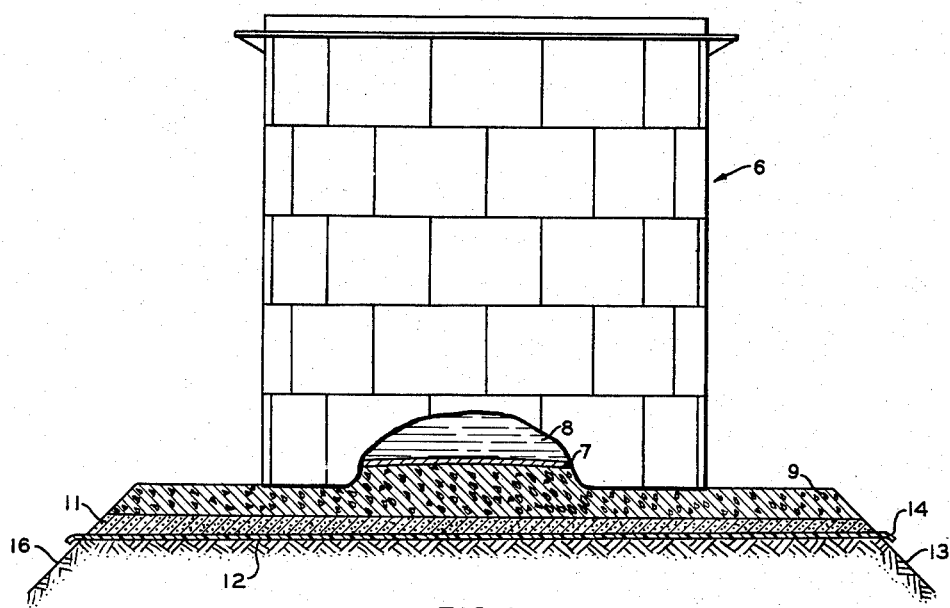

In Figure 1, a storage tank, indicated generally as 6, has a bottom 7, and a liquid 8 therein. Immediately below the bottom 7 is a layer of loosely packed material 9 and immediately below this there is a layer of sand 11. Said layers 9 and 11 rest upon a liquid impervious membrane 12 which is of a larger surface area than said tank bottom 7. Membrane 12 rests upon foundation 13 which may be the ground itself. An exposed periphery portion or lip 14 of membrane 12 extends out from foundation 13.

The membrane 12 is inclined in order to permit the liquid leaking from the tank bottom 7 to seep by means of gravity and collect initially at the lower end or lip 14, and thus obviate the necessity of inspecting the entire peripheral area surrounding the tank bottom. The outside surface of foundation 13 and layers 9 and 11 is preferably shaped in the form of a berm 16.

The membrane employed in our invention is made of any suitable material which is impervious to and not attacked by the liquid stored in the tank when in contact therewith. We prefer in most instances to use a resilient or yieldable material which may easily be shaped to the desired contour of the foundation. Suitable materials include various polymeric substances such as synthetic rubber and plastics. This membrane may be laid down upon the foundation in the form of sheets or, if emulsion-type material is used, it may be sprayed on the foundation. If desired, a plurality of membranes can be used in case one leaks.

Figure 2:
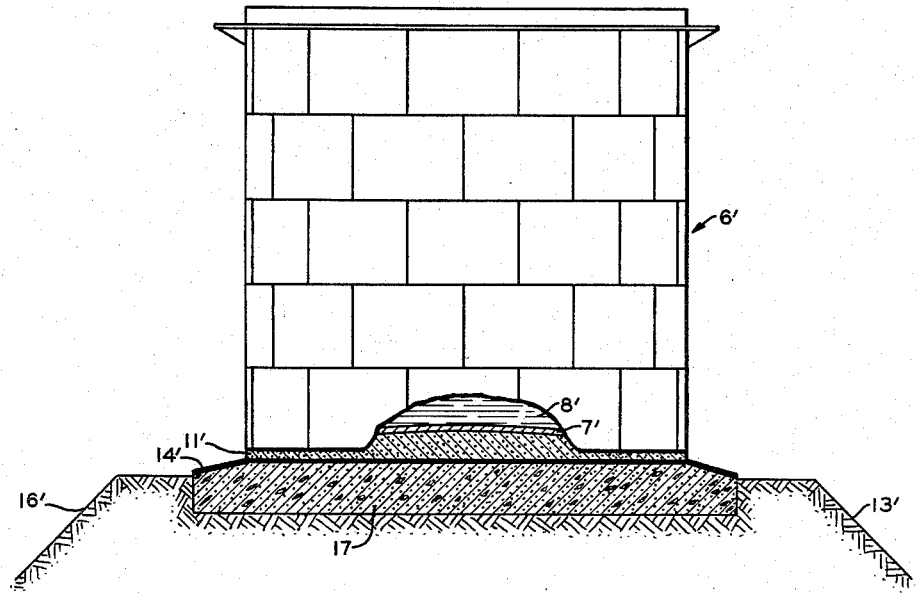
Figure 2 shows another embodiment of the present invention partly in section and partly in elevation.

In Figure 2, a modification of the embodiment of Figure 1 is shown. A reinforced concrete pad 17 is positioned below the tank bottom 7' and a layer of sand 11' is interposed between tank bottom 7' and concrete pad 17. Liquid leaking from the bottom 7' of tank 6' flows along the top of concrete pad 17 to the exposed peripheral area 14' surrounding the tank bottom, where the loss of liquid may be visually detected. This modification illustrates the fact that the liquid impervious or sealing means need not be made of a flexible material. Besides a concrete pad, a sheet of steel or similar material may be used in the practice of this invention.

Figure 3:
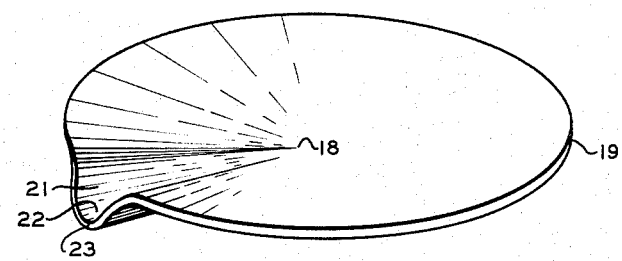
Figures 3 and 4 show in perspective two modifications of the liquid impervious means.
Figure 4:
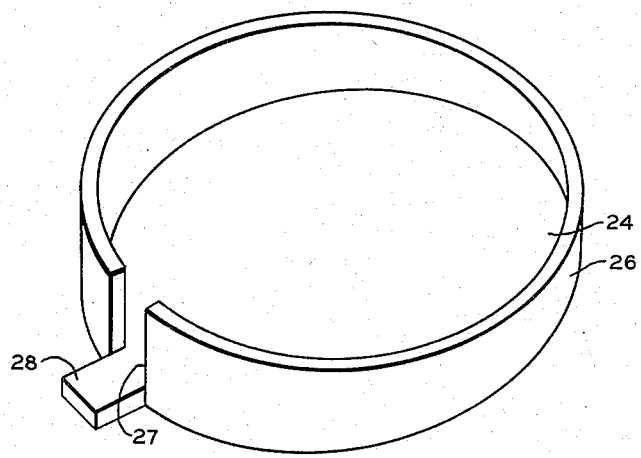

In Figures 3 and 4, modifications of the liquid impervious means are shown. Referring to Figure 3, the center 18 is lower than the periphery 19 and a trough 21 extends radially from center 18 and its bottom 22 terminates at a point 23 lower than center 18. In Figure 4, the bottom 24 has an upright wall 26 at its periphery which has an opening 27 to permit the seepage of liquid to the exposed lip 28 extending from bottom 24. The liquid impervious means may be constructed from a resilient or flexible material, reinforced concrete, etc.

Figure 5:
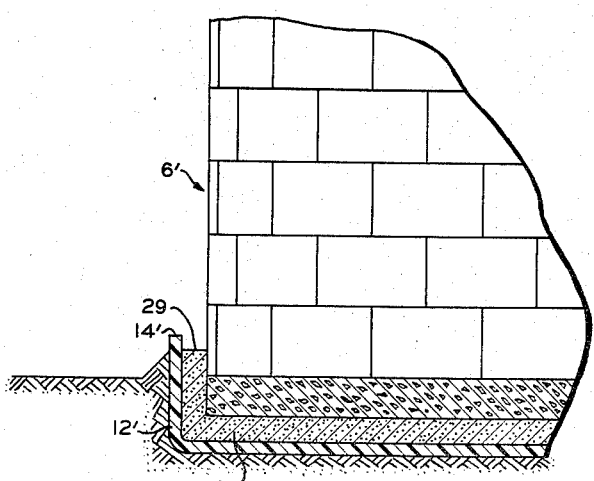
Figure 5 is a fragmentary view similar to the left hand view of Figure 1 but of a modified form of the invention.

In Figure 5, the applicability of our invention to tanks partially buried in the ground is shown. The liquid impervious membrane 12' follows the contour of that part of the tank 6' partially buried and terminates in an exposed portion 14'. The presence of liquid is detected on the top 29 of the layer of base material 31.

The practice of our invention is not limited to any particular type of liquid, though the choice of material to be used in the construction of the liquid impervious means will be governed according to the nature of the liquid so stored. Liquids which are particularly applicable in the practice of this invention include hydrocarbon liquids such as gasoline and lubricating oil, alcohol and acetone, mineral and organic acids, aqueous and nonaqueous solutions, organic chemicals, etc.

The loosely packed material is preferably constructed of a mixture of crushed rock and a sufficient amount of heavy oil to pack the rock. The purpose of this layer is to provide an immediate foundation for the tank and is of such particle size as to allow the leaking liquid to seep down to the liquid impervious membrane by force of gravity. A layer of sand may also be employed just above the liquid impervious membrane. When a membrane is employed as the liquid impervious means, the sand serves to cushion the layer of crushed rock and prevent it from puncturing the membrane. In the case where a concrete pad is employed, the sand layer insulates the concrete pad from welding heat during the construction and repair of the tank bottom. Materials other than crushed rock and sand may be employed in the practice of this invention and it is to be understood that this invention is not necessarily limited to these enumerated materials. The depth of the various layers of base material and the thickness of the liquid impervious means are obviously dependent upon the size of the tank employed and the desired depths and thicknesses may be readily determined by one skilled in the art upon reading this disclosure.

While the invention herein illustrated has been embodied in a tank erected on the surface of the ground and provided with a substantially flat bottom, that slopes either towards the center, or towards the side wall of the tank, it is to be understood that my invention is applicable to tanks provided with curved bottoms.

As will be obvious to those skilled in the art upon reading this disclosure many modifications, substitutions, and changes will become apparent and may be employed within the scope of this invention.

We claim:
1. Apparatus for storing liquids which comprises, in combination, a tank having upright side walls and a substantially flat bottom, a foundation, a substantially horizontal circular resilient liquid sealing means laid upon said foundation and having an exposed peripheral portion, said means positioned below the entire bottom of said tank in spaced relation thereto and having a surface area larger than the bottom of said tank, and a layer of liquid permeable base material completely filling the space between said means and the bottom of said tank, said liquid permeable base material forming the support for said tank.

2. Apparatus according to claim 1 wherein said layer of liquid permeable base material comprises a top layer of crushed rock and a bottom layer of sand.

3. Apparatus according to claim 1 wherein said layer of liquid permeable base material consists of a layer of sand.

4. A leak detecting device for a liquid storage tank comprising, in combination, a foundation, a substantially horizontal resilient liquid sealing means laid upon said foundation and having an exposed peripheral portion extending therefrom, said means having a surface area larger than the bottom of said tank and positioned below the entire bottom thereof, and a layer of liquid permeable base material completely filling the space between said means and the bottom of said tank, said liquid permeable base material forming the support for said tank.

5. The combination of claim 4 wherein said means is a liquid impervious resilient membrane.

6. A leak detecting device for a partially buried liquid storage tank comprising, in combination, a resilient liquid sealing means having a substantially horizontal bottom and an upright wall, said bottom having a surface area larger than the bottom of said tank and positioned below the entire bottom thereof, said walls extending upward around the outside of that portion of said tank partially buried and terminating at its periphery in an exposed area, a foundation upon which said means rests, and a layer of liquid permeable base material completely filling the space between said means and said partially buried portion of said tank, said liquid permeable base material forming the support for said tank.

References Cited in the file of this patent

UNITED STATES PATENTS

| | | |
|---|---|---|
| 1,083,148 | Sparks | Dec. 30, 1913 |
| 1,630,647 | Williams | May 31, 1927 |
| 2,186,185 | Walker | Jan. 9, 1940 |
| 2,333,315 | Klingberg | Nov. 2, 1943 |
| 2,460,054 | Wiggins | Jan. 25, 1949 |
| 2,520,883 | Kornemann et al. | Aug. 29, 1950 |
| 2,531,159 | Rowell | Nov. 21, 1950 |

FOREIGN PATENTS

| | | |
|---|---|---|
| 709,393 | Great Britain | May 26, 1954 |

OTHER REFERENCES

Publication: "Preparing the Land for Building," Architectural Record, pp. 154–159, July 1951. (Copy in 61–10.)